United States Patent Office 3,416,896
Patented Dec. 17, 1968

3,416,896
ANALYSIS OF GASES CONTAINING LOW
CONCENTRATIONS OF PHOSGENE
Cornelius B. Murphy, Scotia, N.Y., assignor to General
Electric Company, a corporation of New York
No Drawing. Filed May 5, 1965, Ser. No. 455,669
6 Claims. (Cl. 23—232)

ABSTRACT OF THE DISCLOSURE

A method is disclosed for the detection and analysis of low levels of concentration of phosgene gas in other non-reactive gases such as air is disclosed. Concentrations of phosgene as low as 0.1 part per million may be detected by exposing the gas to a source of ammonia to produce small nucleogenic solid reaction particles which may be measured in a condensation nuclei detector.

---

This invention relates to the detection and analysis of low levels of concentration of phosgene gas in other gases and, more particularly, to the substantially continuous analytical monitoring of a gas stream for the presence of phosgene at levels of concentration as low as 0.1 part per million.

It has been determined that concentration levels of phosgene gas in air in excess of about 0.1 part per million is a potential health hazard and constitutes a serious problem, particularly in industrial plants where, because of the nature of the work and the chemical processes and reagents involved, relatively small but potentially dangerous amounts of phosgene gas may be inadvertently liberated in the atmosphere to which plant personnel are exposed. Additionally, even in cases where workers may not be exposed to such at atmosphere, phosgene gas is relatively highly reactive to some organic materials and may cause undesirable effects such as, for example, relatively rapid rates of deterioration of certain industrial plastics or elastomers. Prior to this invention, no means have been readily available to provide a continuous monitoring of gases for the presence of phosgene. It would, therefore, be desirable to accomplish such a continuous monitoring method and to provide apparatus which would render a quick and accurate detection and analysis of gases containing phosgene at concentration levels as low as about 0.1 part per million.

It is, therefore, a principal object of this invention to provide a substantially continuous analysis of a gas stream for the presence of low levels of concentration of phosgene gas.

It is a further object of this invention to provide a substantially continuous analysis of atmospheric air for the presence of low levels of concentration of about 0.1 part per million of phosgene gas.

Other and specifically different objects of this invention will become apparent to those skilled in the art from the following disclosure and claims.

Briefly stated, and in accordance with one aspect of the invention, volumetrically controlled samples of a gas such as air suspected of containing small amounts of phosgene gas, $COCl_2$, are passed through an absolute filter to remove any entrained particulate solid matter, passed in contact with a source of ammonia whereupon any phosgene gas present reacts therewith according to the following equation:

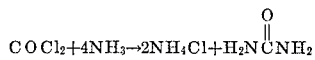

to form very small nucleogenic solid particles of ammonium chloride and urea. As stated, the solid ammonium chloride and urea particles thus formed are extremely small and as such are not capable of causing significant light scatter. They are then carried by the gas sample through a humidification step which increases the relative humidity of the gas sample to near saturation, whereupon the ambient pressure of the gas is sharply reduced, causing water vapor to condense upon the ammonium chloride and urea particles to effectively increase the size of each particle and thereby increase their ability to scatter light. The degree of light scattering thereby produced is directly proportional to the concentration of phosgene gas in the original gas sample and is measurable by the "Condensation Nuclei Detector," an apparatus more fully disclosed in U.S. Patent 3,037,421 to J. E. Bigelow et al., issued July 4, 1962, and assigned to the assignee of the present invention.

Since this apparatus is capable of accepting as many as five or more samples per second for analysis, it will therefore be seen that a substantially continuous monitoring of a gas for the presence of phosgene gas is realized.

More specifically, and by way of example, atmospheric air containing about 20 parts per million of phosgene gas was passed through an absolute filter to remove any entrained or suspended solid particulate material. The filtered gas-air mixture was then passed in contact with solid ammonium carbonate contained in a filter flask and thence to the inlet of a condensation nuclei detector of the type previously referenced.

As described, the air sample was humidified and expanded to cause condensation of water vapor on the nucleogenic particles or "condensation nuclei" of ammonium chloride and urea and the light scattering of these particles was measured. The measurement of this sample resulted in a signal of about 24,000 condensation nuclei per second. Since the relationship between the number of condensation nuclei produced to the concentration of the reactive gas at these concentration levels is essentially linear, it is obvious that the concentration of phosgene may be reduced by at least two to three decades and adequate monitoring accomplished at these levels of concentration.

While for the purpose of providing a disclosure of a specific working example, the detection of phosgene gas in air using solid ammonium chloride as a source of ammonia has been described, it will be immediately apparent to those skilled in the art that any suitable source of ammonia or its equivalent may be used. For example, the source may be an aqueous solution of ammonium carbonate which upon warming yields ammonia, or ammonia gas may be injected into the gas stream. Obviously, ammonia equivalents other than ammonium carbonate may be employed, such as for example, hydrazine or the amines. When hydrazine is employed, the reaction products are the hydrazide of carbonic acid and hydrazine hydrochloride as condensation nuclei, and when an amine is employed, the products are a substituted amide and the amine hydrochloride. It will be appreciated that mixtures of these materials may be employed. Further, the gas containing the phosgene need not be limited to air but may comprise any gas or mixture of gases which are inert with respect to the phosgene-ammonia reaction set forth previously, or if not inert, any reaction which takes place does not interfere with the production of the ammonium chloride and urea condensation nuclei nor produce other nucleogenic particles. To this extent, suitable gases may be said to be "non-reactive" and it will be understood that a "non-reactive gas" as referred to elsewhere in this specification and claims is intended to be so defined.

While the invention has been described with reference to particular embodiments thereof, it will be understood that numerous changes may be made without departing from the invention. It is, therefore, intended in the appended claims to cover these and all such equivalent variations of application and structure as are within the true spirit and scope of the foregoing disclosure.

What I claim as new and desire to secure by Letters Patent of the United States is:

1. A method for the detection and analysis of phosgene gas admixed in a non-reactive gas stream which comprises substantially continuously passing a stream of non-reactive gas containing amounts of phosgene as low as 0.1 part per million through a filter to remove entrained particles therefrom, contacting said filtered gas stream with an ammoniacal vapor selected from the group consisting of ammonia, ammonia equivalents, and mixtures thereof to form reaction products in said non-reactive gas stream which comprise nucleogenic solid particles suspended in said non-reactive gas stream, the number of said particles having a direct proportional relationship to the concentration of phosgene in said gas, humidifying said gas stream to near saturation, reducing the pressure of said gas stream to cause the condensation of water vapor on said nucleogenic particles, and measuring the light scattering effect of said particles.

2. A method as set forth in claim 1 in which said non-reactive gas is air.

3. A method as set forth in claim 1 in which the reactant is hydrazine.

4. A method as set forth in claim 1 in which said ammonia is derived from an amine.

5. A method as set forth in claim 1 in which the reactant is ammonia derived from an inorganic ammonium compound.

6. A method as set forth in claim 5 in which said ammonium compound is ammonium carbonate.

References Cited

UNITED STATES PATENTS

| | | | |
|---|---|---|---|
| 2,774,652 | 12/1956 | Vonnegut | 23—232 |
| 3,094,392 | 6/1963 | Skala | 23—232 |
| 3,117,841 | 1/1964 | Van Luik et al. | 23—232 |

OTHER REFERENCES

Dennis et al.: "Gas Analysis," 1929, pp. 302–303, copy in group 171, P.O.S.L. #2D–121–04.

MORRIS O. WOLK, *Primary Examiner.*

R. SERWIN, *Assistant Examiner.*